(12) United States Patent
Minami et al.

(10) Patent No.: US 7,823,677 B2
(45) Date of Patent: Nov. 2, 2010

(54) MOTORCYCLE

(75) Inventors: Hidemi Minami, Saitama (JP); Koichi Nozoe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 354 days.

(21) Appl. No.: 11/978,724

(22) Filed: Oct. 30, 2007

(65) Prior Publication Data

US 2008/0156570 A1 Jul. 3, 2008

(30) Foreign Application Priority Data

Dec. 27, 2006 (JP) ............................. 2006-352327

(51) Int. Cl.
*B62K 11/02* (2006.01)

(52) U.S. Cl. ...................... 180/219; 180/311

(58) Field of Classification Search ................ 180/218, 180/219, 220, 311; 280/274, 281.1; 296/371.1; 224/413, 415, 419, 427
See application file for complete search history.

(56) References Cited

U.S. PATENT DOCUMENTS

| | | | | |
|---|---|---|---|---|
| 4,260,085 A | * | 4/1981 | Jefferson | 224/414 |
| 4,466,660 A | * | 8/1984 | Mabie | 297/215.11 |
| 5,025,883 A | * | 6/1991 | Morinaka et al. | 180/219 |
| 5,064,016 A | * | 11/1991 | Iwai et al. | 180/215 |
| 5,558,260 A | * | 9/1996 | Reichert | 224/413 |
| 5,697,671 A | * | 12/1997 | Shavitz | 297/250.1 |
| 6,142,253 A | * | 11/2000 | Mueller et al. | 180/219 |
| 6,659,547 B2 | * | 12/2003 | Petersen | 297/215.1 |
| 6,695,330 B2 | * | 2/2004 | Hata | 280/152.3 |
| 7,284,796 B2 | * | 10/2007 | Snelson | 297/230.1 |
| 2004/0182633 A1 | * | 9/2004 | Miyakawa et al. | 180/312 |
| 2007/0007758 A1 | * | 1/2007 | Maeda et al. | 280/788 |

FOREIGN PATENT DOCUMENTS

| | | |
|---|---|---|
| JP | 62-33978 U | 2/1987 |
| JP | 63-93292 U | 6/1988 |
| JP | 2678603 B2 | 8/1997 |
| JP | 2006-103647 A | 4/2006 |

\* cited by examiner

*Primary Examiner*—Tony H. Winner
(74) *Attorney, Agent, or Firm*—Birch, Stewart, Kolasch & Birch, LLP

(57) ABSTRACT

A vehicle body includes a pair of left and right main frames extending rearwardly from a front portion of the vehicle body and a seat extending rearwardly from a substantially central portion for providing seating for an occupant. A trunk is provided on the rear side of the seat for storing luggage with a backrest mounted to a front wall of the trunk for supporting the back of the occupant. The occupant includes a rider and a passenger, and the seat includes a front seating portion for the rider and a rear seating portion for the passenger arranged in tandem in the longitudinal direction of the vehicle body. A pair of left and right rear frames for supporting the trunk extend to a position below the rear seating portion, so that the load of the passenger sitting on the rear seating portion is borne by the rear frames.

14 Claims, 3 Drawing Sheets

MOTORCYCLE

CROSS-REFERENCE TO RELATED APPLICATIONS

The present application claims priority under 35 USC 119 to Japanese Patent Application No. 2006-352327 filed on Dec. 27, 2006 the entire contents thereof is hereby incorporated by reference.

BACKGROUND OF THE INVENTION

1. Field of the Invention

The present invention relates to a motorcycle having a trunk at a rear portion of a vehicle body and also having a backrest mounted to a front wall of the trunk.

2. Description of Background Art

A motorcycle is known that includes a vehicle body with a seat extending rearwardly from a central portion of the vehicle body for providing the seating of an occupant. A trunk is provided on the rear side of the seat for storing luggage with a backrest mounted to a front wall of the trunk for supporting the back of the occupant. See, for example, Japanese Patent No. 2678603 (FIGS. 1 and 2).

Referring to FIG. 2 in Japanese Patent No. 2678603, the body frame of a motorcycle 1 is composed of a pair of left and right main frame pipes 6 each having a rectangular cross section with a pair of left and right seat supporting pipes 8 connected to the rear ends of the main frame pipes 6 and extending rearwardly therefrom. A pair of left and right upper pipes 11 are connected to the rear ends of the seat supporting pipes 8 and extend rearwardly therefrom.

Referring also to FIG. 1 in Japanese Patent No. 2678603, a rider seat 18 and a passenger seat 19 are supported by the seat supporting pipes 8. A backrest 25 is supported by a central trunk 24. The central trunk 24 is supported by the upper pipes 11.

Thus, the passenger seat 19 is supported by the seat supporting pipes 8, and the backrest 25 is supported through the central trunk 24 to the upper pipes 11.

During operation of the vehicle, the vehicle undergoes various vibrations. The vibrations are transmitted through the seat supporting pipes 8 to the passenger seat 19. Further, the vibrations of the seat supporting pipes 8 are also transmitted to the upper pipes 11, and further transmitted through the central trunk 24 mounted on the upper pipes 11 to the backrest 25. Thus, the path of transmission of vibrations to the passenger seat 19 is different from the path of transmission of vibrations to the backrest 25.

Accordingly, the passenger undergoes vibrations having different vibration characteristics from the passenger seat 19 and the backrest 25, causing a problem with respect to the comfort of the ride.

SUMMARY AND OBJECTS OF THE INVENTION

It is accordingly an object of the present invention to provide a technique which can improve the ride comfort of an occupant in a motorcycle having a backrest.

In accordance with an embodiment of the invention, there is provided a motorcycle including a vehicle body, a main frame extending rearwardly from a front portion of the vehicle body, a seat extending rearwardly from a substantially central portion of the vehicle body for providing the seating of an occupant, a trunk provided on the rear side of the seat for storing a luggage, and a backrest mounted to a front wall of the trunk for supporting the back of the occupant. A rear frame, for supporting the trunk, is detachably mounted to the main frame. The rear frame extends to a position below the seat.

In accordance with an embodiment of the invention, the occupant includes a rider and a passenger; the seat includes a front seating portion for the rider and a rear seating portion for the passenger. The front and rear seating portions are arranged in tandem in the longitudinal direction of the vehicle body with the rear frame extending to a position below the rear seating portion, so that the load of the passenger sitting on the rear seating portion is borne by the rear frame.

In accordance with an embodiment of the invention, the main frame is formed by welding cast parts, and the rear frame is formed by welding bent parts formed from tubular members.

According to an embodiment of the invention, the trunk and the seat are supported by the rear frame. Accordingly, both the seat and the backrest are supported by the rear frame, so that during operation of the vehicle, both the seat and the backrest are vibrated with the same vibration characteristics. Thus, the occupant undergoes vibrations having the same characteristics from the seat and the backrest. Accordingly, there is no possibility that the occupant may feel a discomfort due to the difference between vibration characteristics of the vibrations transmitted from the seat and the backrest, thus improving the comfort of the ride.

According to an embodiment of the invention, the seat includes the rear seating portion, and the rear seating portion is supported by the rear frame. Accordingly, it is not necessary to support the front seating portion on the rear frame, so that the rear frame can be reduced in size for improving the ride comfort of the passenger.

According to an embodiment of the invention, the main frame is formed by welding cast parts, and the rear frame is formed by welding bent parts formed from tubular members. Thus, a portion of the body frame required to have a high strength is formed from cast parts, and the other portion not required to have so high strength is formed from tubular members. Accordingly, the body frame can be easily produced and a weight reduction of the body frame can also be easily attained.

Further, the seat and the backrest are supported by the rear frame. The main frame is different in wall thickness or the like from the rear frame, so that the vibration characteristics of the main frame are usually different from those of the rear frame during operation of the vehicle.

According to an embodiment of the present invention, the seat and the backrest are supported to the rear frame formed by welding tubular members, so that the comfort of the ride of the occupant sitting on the seat is not impaired.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will now be described with reference to the attached drawings. The orientation of each drawing is the same as that of the reference symbols included therein.

Figure 1:
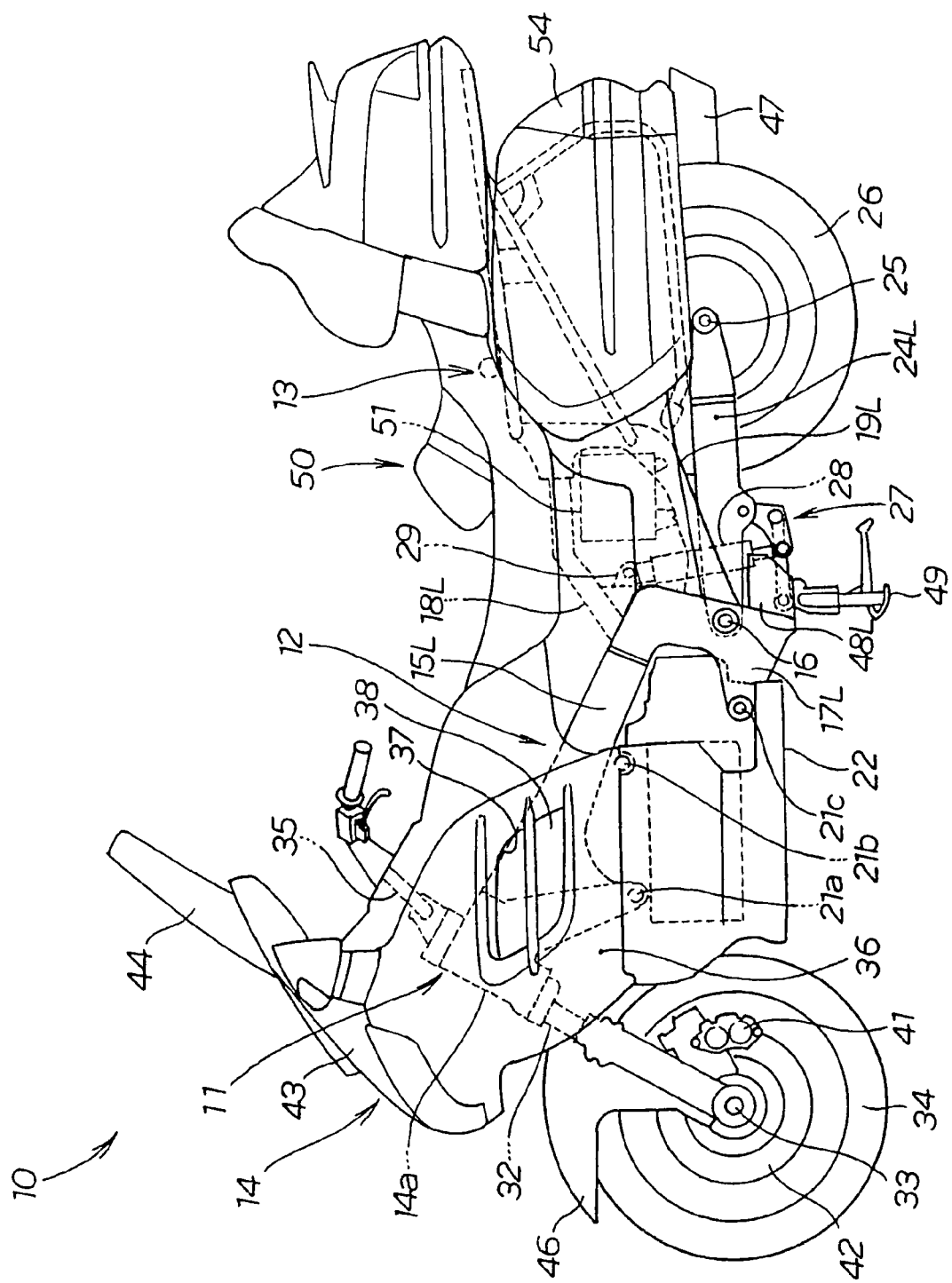
FIG. 1 is a left side view of a motorcycle according to the present invention.

FIG. 1 is a left side view of a motorcycle 10 according to the present invention. The motorcycle 10 has a body frame 11. The body frame 11 is composed of a main portion 12 and a rear portion 13 connected to the main portion 12 on the rear side thereof.

The main portion 12 is composed mainly of a pair of left and right main frames 15L and 15R (only the left main frame 15L being shown) extends rearwardly from a head pipe 14a constituting a front portion of a vehicle body 14. A pair of left and right pivot plates 17L and 17R (only the left pivot plate 17L being shown) respectively are mounted to the rear ends of the left and right main frames 15L and 15R and having a pivot shaft 16 extending in the lateral direction of the vehicle. A pair of left and right seat rails 18L and 18R (only the left seat rail 18L being shown) respectively extend obliquely upwardly from the upper portions of the left and right pivot plates 17L and 17R and further extending horizontally rearwardly. A pair of left and right middle frames 19L and 19R (only the left middle frame 19L being shown) respectively connect the rear ends of the left and right seat rails 18L and 18R and the intermediate portions of the left and right pivot plates 17L and 17R to thereby support the left and right seat rails 18L and 18R. The rear portion 13 will be hereinafter described in detail.

An engine 22 is mounted through a plurality of fastening members 21a, 21b, and 21c to the main frames 15L and 15R on the lower side thereof. The engine 22 is a horizontally opposed, six-cylinder, water-cooled engine.

A pair of left and right rear swing arms 24L and 24R (only the left rear swing arm 24L being shown) are respectively mounted to the left and right pivot plates 17L and 17R so as to be vertically swingable about the pivot shaft 16. A rear wheel 26 is rotatably mounted through a rear axle 25 to the rear ends of the left and right rear swing arms 24L and 24R. The rear wheel 26 is driven by a drive force generated from the engine 22.

A rear shock absorber unit 28 extends vertically and is mounted at its lower end through a link mechanism 27 to the intermediate portions of the rear swing arms 24L and 24R. The upper end of the rear shock absorber unit 28 is mounted to a bracket 29 formed on the pivot plates 17L and 17R.

A front fork 32 is steerably mounted to the head pipe 14a. A front wheel 34 is rotatably mounted through a front axle 33 to the lower ends of the front fork 32. A steering handle 35 is mounted to the upper end of the front fork 32.

A main cowl 36 is provided so as to cover a front portion of the body frame 11 with an opening 37 being formed at a side portion of the main cowl 36. A radiator unit 38 for cooling the engine 22 is located so as to face the opening 37.

The motorcycle 10 further includes a front disc brake unit 41, front brake disc 42, front cowl 43, windshield 44, front fender 46, muffler 47, a pair of left and right main stand brackets 48L and 48R (only the left main stand bracket 48L being shown), main stand 49, seat 50, and battery 51.

Figure 2:
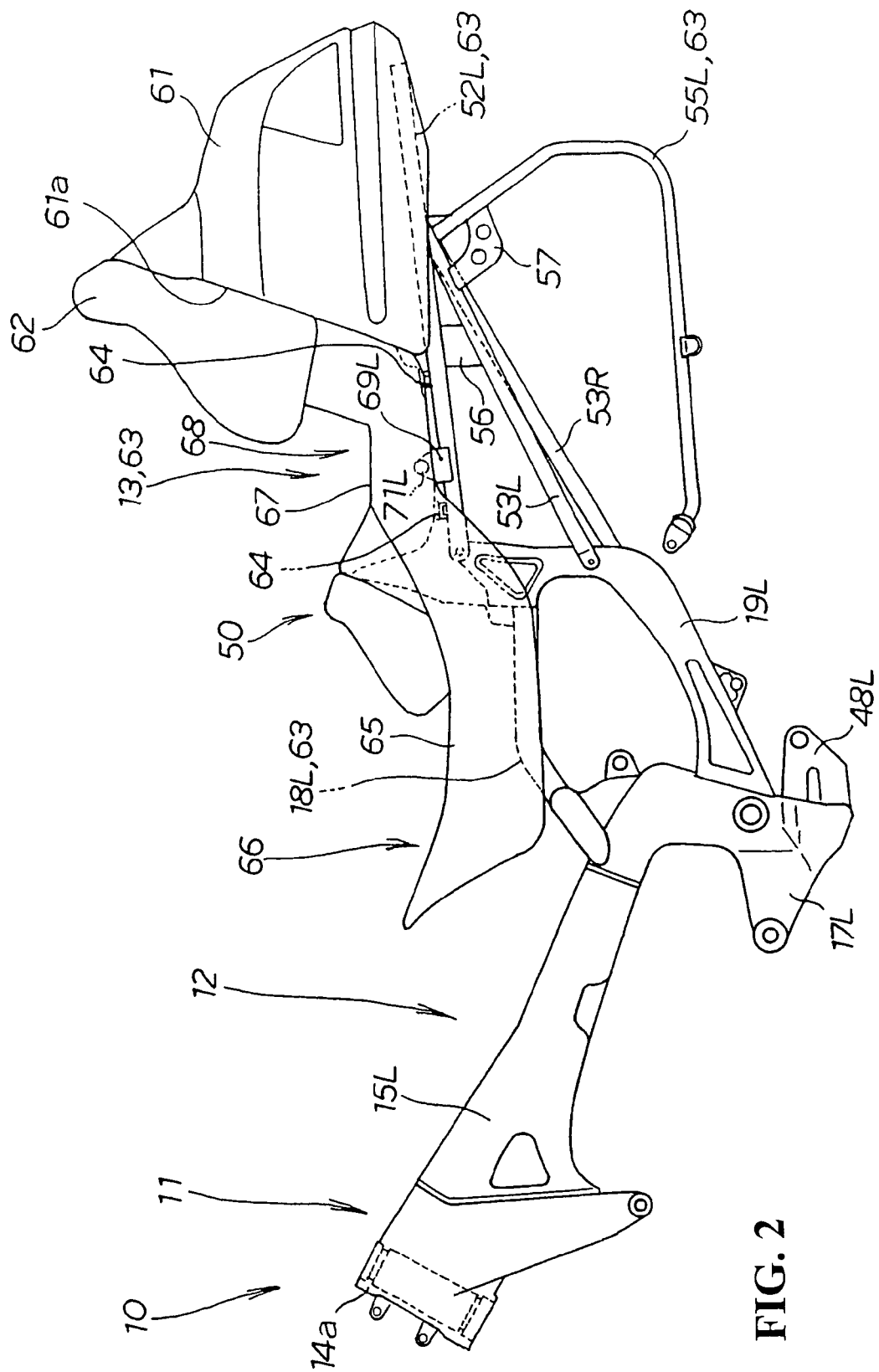
FIG. 2 is a left side view of a body frame of the motorcycle shown in FIG. 1, illustrating the mounting of a seat and a trunk to the body frame.

FIG. 2 is a left side view of the body frame 11 of the motorcycle 10 shown in FIG. 1, illustrating the mounting of the seat 50 and a trunk 61 to the body frame 11.

As mentioned above, the body frame 11 of the motorcycle 10 is composed of the main portion 12 and the rear portion 13.

The rear portion 13 is composed mainly of a pair of left and right rear frames 52L and 52R (only the left rear frame 52L being shown) respectively extending rearwardly from the upper ends of the left and right middle frames 19L and 19R. A pair of left and right seat stays 53L and 53R respectively connect the rear portions of the left and right rear frames 52L and 52R and the intermediate portions of the left and right middle frames 19L and 19R to thereby support the rear frames 52L and 52R from the lower side thereof. A pair of left and right auxiliary stays 55L and 55R (only the left auxiliary stay 55L being shown) respectively extend obliquely downwardly from the rear portions of the left and right rear frames 52L and 52R and further extending horizontally frontward for mounting a side trunk 54 (see FIG. 1). Gusset members 56 and 57 are provided.

The trunk 61 for storing luggage is mounted to the rear frames 52L and 52R with a backrest 62 for supporting the back of the occupant of the seat 50 being mounted to a front wall 61a of the trunk 61.

The rear frames 52L and 52R for supporting the trunk 61 are detachably mounted to the main frames 15L and 15R, respectively, and the rear frames 52L and 52R extend to a position below the seat 50.

The trunk 61 is located on the rear side of the seat 50, and the backrest 62 is provided on the front wall 61a of the trunk 61.

In this preferred embodiment, all of the head pipe 14a, the main frames 15L and 15R, the pivot plates 17L and 17R, and the middle frames 19L and 19R are aluminum castings (cast aluminum parts), which are members formed by die casting.

On the other hand, all of the seat rails 18L and 18R, the rear frames 52L and 52R, and the auxiliary stays 55L and 55R are formed from tubular members 63.

The main frames 15L and 15R are formed by welding cast parts, and the rear portion 13 including the rear frames 52L and 52R is formed by welding bent parts formed from the tubular members 63.

The cross section of each tubular member 63 may be circular or rectangular.

Further, the rear portion 13 may be configured by combining the tubular members 63 having different odd cross sections.

As mentioned above, the main frames 15L and 15R are formed by welding cast parts, and the rear frames 52L and 52R are formed by welding bent parts formed from the tubular members 63. Thus, a portion of the body frame 11 required to have a high strength is formed from cast parts, and the other portion not required to have so high strength is formed from the tubular members 63. Accordingly, the body frame 11 can be easily produced and the weight reduction of the body frame 11 can also be easily attained.

In this preferred embodiment, a front seat 66 having a front seating portion 65 is mounted to the seat rails 18L and 18R. On the other hand, a rear seat 68 having a rear seating portion 67 is mounted to the rear frames 52R and 52L by means of a pair of left and right brackets 69L and 69R (only the left bracket 69L being shown) with a pair of left and right fastening bolts 71L and 71R (only the left fastening bolt 71L being shown). The front and rear seats 66 and 68 are separate members. Further, the trunk 61 is mounted to the rear frames 52L and 52R, and the backrest 62 is mounted to the front wall 61a of the trunk 61 so as to be arranged continuously to the rear seat 68.

Two elastic members 64 are interposed between the rear seat 68 and the rear frames 52L and 52R, so that the load on the rear seat 68 is borne through the elastic members 64 to the upper surfaces of the rear frames 52L and 52R.

Thus, the seat 50 for the occupant is composed of the front seat 66 and the rear seat 68 arranged in tandem in the longitudinal direction of the vehicle body 14. The occupant includes a rider and a passenger. Usually, the rider sits on the front seating portion 65 and the passenger sits on the rear seating portion 67.

While the front seat 66 having the front seating portion 65 is separate from the rear seat 68 having the rear seating portion 67 in this preferred embodiment, the front seat 66 and the rear seat 68 may be formed integrally with each other.

In this preferred embodiment, the seat 50 of the motorcycle 10 includes the front seating portion 65 for the rider and the rear seating portion 67 for the passenger with the front and rear seating portions 65 and 67 being arranged in tandem in the longitudinal direction of the vehicle body 14. Further, the rear frames 52L and 52R extend to a position below the rear seating portion 67, so that the load of the passenger sitting on the rear seating portion 67 is borne by the rear frames 52L and 52R.

Thus, the seat 50 includes the rear seating portion 67, and the rear seating portion 67 is supported by the rear frames 52L and 52R. On the other hand, the load on the front seating portion 65 of the seat 50 is borne by the seat rails 18L and 18R separate from the rear frames 52L and 52R. Thus, it is not necessary to support the front seat 66 on the rear frames 52L and 52R, so that the rear frames 52L and 52R can be reduced in size for improving the comfort of the ride of the passenger.

The operation of the motorcycle 10 according to this preferred embodiment will now be described.

Figure 3A:
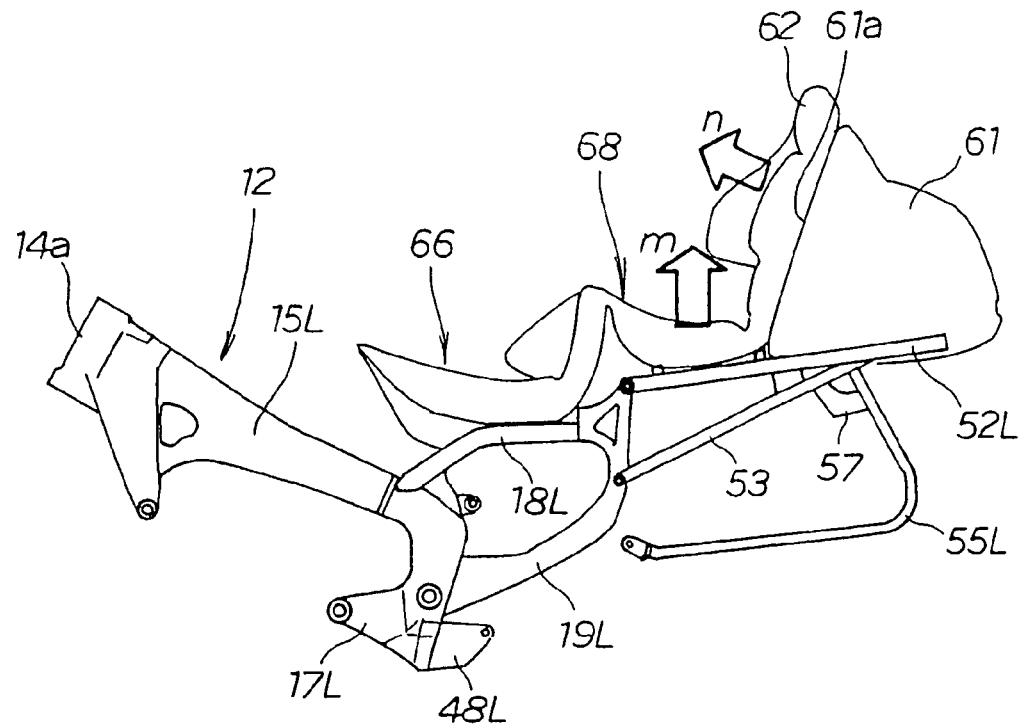
FIGS. 3(a) and 3(b) are left side views for illustrating the operations of a preferred embodiment of the present invention and a comparison, respectively.
Figure 3B:
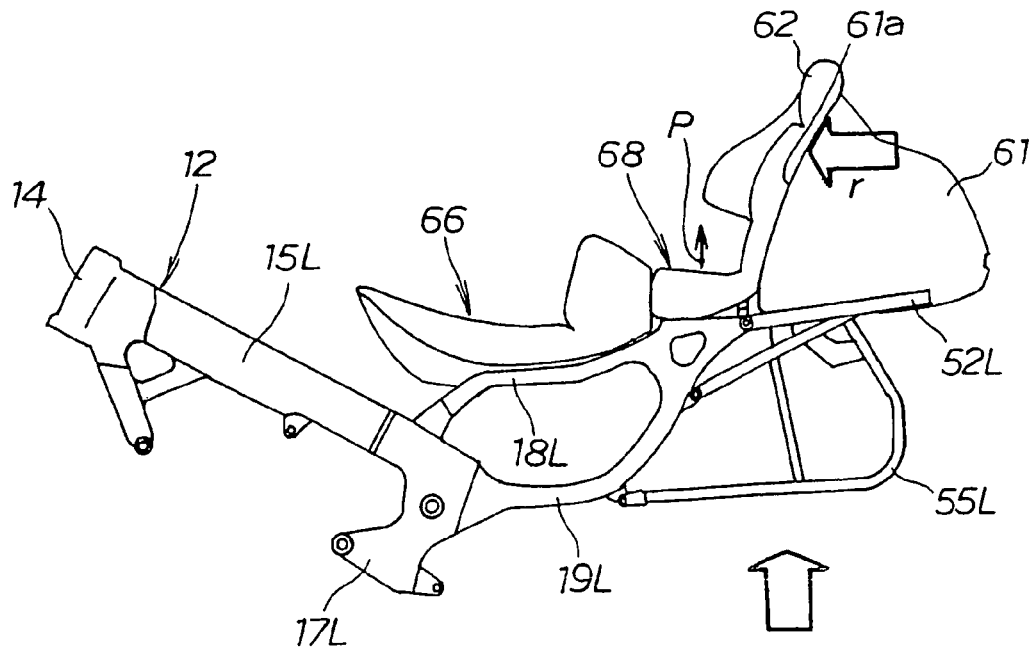

FIGS. 3(a) and 3(b) illustrate the operations of this preferred embodiment and a comparison, respectively.

As shown in FIG. 3(a), the front seat 66 is supported by the seat rails 18L and 18R of the main portion 12. On the other hand, the rear seat 68, the trunk 61, and the backrest 62 mounted on the front wall 61a of the trunk 61 are supported by the rear frames 52L and 52R.

As shown in FIG. 3(b), both the front seat 66 and the rear seat 68 are supported by the seat rails 18L and 18R of the main portion 12. On the other hand, the trunk 61 and the backrest 62 mounted on the front wall 61a of the trunk 61 are supported by the rear frames 52L and 52R.

Further, in the comparison shown in FIG. 3(b), the backrest 62 is supported by the rear frames 52L and 52R, and the rear seat 68 is supported by the seat rails 18L and 18R. Accordingly, during the operation of the motorcycle in the comparison, the passenger undergoes vibrations having different vibration characteristics from the backrest 62 and the rear seat 68. More specifically, the vibrations transmitted from the backrest 62 are different in characteristics from the vibrations transmitted from the rear seat 68. The passenger undergoes vibrations from the rear seat 68 in the direction shown by an arrow p, and further undergoes vibrations from the backrest 62 in the direction shown by an arrow r. Accordingly, the passenger may feel discomfort due to the vibrations transmitted from the backrest 62.

To the contrary, according to the preferred embodiment shown in FIG. 3(a), both the rear seat 68 and the backrest 62 are supported by the rear frames 52R and 52L. Accordingly, during the operation of the motorcycle according to this preferred embodiment, the rear seat 68 and the backrest 62 vibrate at the same frequency. More specifically, the vibrations transmitted from the backrest 62 are similar in characteristics to the vibrations transmitted from the rear seat 68. The passenger undergoes vibrations from the rear seat 68 in the direction shown by an arrow m, and further undergoes vibrations from the backrest 62 in the direction shown by an arrow n. Since the vibration characteristics of the backrest 62 are similar to those of the rear seat 68, there is no possibility that the passenger may feel a discomfort due to the vibrations transmitted from the backrest 62, thus improving the ride comfort of the passenger.

Referring back to FIG. 2, the seat 50 (the rear seat 68) and the backrest 62 are supported to the rear frames 52L and 52R. Further, the main frames 15L and 15R are different in wall thickness or the like from the rear frames 52L and 52R, so that the vibration characteristics (including the frequency) of the main frames 15L and 15R are usually different from those of the rear frames 52L and 52R during the operation of the motorcycle 10.

According to the present invention, the seat 50 (the rear seat 68) and the backrest 62 are supported to the rear frames 52L and 52R formed by welding the tubular members 63, so that the ride comfort of the occupant (the passenger) sitting on the seat 50 (the rear seat 68) is not impaired.

While the present invention is applied to a motorcycle in this preferred embodiment, the present invention may be applied to a saddle riding type vehicle.

The rear frame may extend to a position below the front seating portion, and the front seating portion may be supported by the rear frame.

Further, the main frame may be formed by welding a plurality of tubular members.

The present invention is suitably applicable to a motorcycle having a backrest.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle including a vehicle body, a main frame extending rearwardly from a front portion of said vehicle body, a seat extending rearwardly from a substantially central portion of said vehicle body for providing seating for an occupant, a trunk provided on a rear side of said seat for storing luggage, and a backrest mounted to a front wall of said trunk for supporting a back of said occupant, wherein a rear frame for supporting said trunk is detachably mounted to said main frame, and said rear frame extends to a position below said seat wherein said main frame includes a left frame and a right frame extending rearwardly from a head pipe, left and right pivot plates mounted on a rear end of the left and right main frames, and left and right seat rails extending obliquely upwardly from an upper portion of the left and right pivot plates, said left frame, right frame and head pipe and said left pivot plate, right pivot plate, left seat rail and right seat rail being joined together by welding cast parts, wherein the seat includes a front seat and a rear seat, said front seat being secured to said left and right seat rails, said rear seat being secured to the rear frame, and wherein the rear frame is secured to a rear portion of said left and right seat rails for enabling a path of transmission of vibrations to said rear seat to be distinct from a path of transmission of vibrations to said front seat.

2. The motorcycle according to claim 1, wherein:
said occupant includes a rider and a passenger;
said front and rear seats are arranged in tandem in a longitudinal direction of said vehicle body; and
said rear frame extends to a position below said rear seating portion, so that the load of the passenger sitting on said rear seating portion is borne by said rear frame.

3. The motorcycle according to claim 1, said rear frame is formed by welding bent parts formed from tubular members.

4. The motorcycle according to claim 1, wherein said rear frame includes left and right frame members being constructed of tubular members, and wherein the cast parts of the main frame provide a high strength relative to the tubular members of the rear frame.

5. A motorcycle including a vehicle body, a main frame extending rearwardly from a front portion of said vehicle body, a seat extending rearwardly from a substantially central portion of said vehicle body for providing seating for an occupant, a trunk provided on a rear side of said seat for storing luggage, and a backrest mounted to a front wall of said trunk for supporting a back of said occupant,
wherein a rear frame for supporting said trunk is detachably mounted to said main frame, and said rear frame extends to a position below said seat
wherein said main frame includes a left frame and a right frame extending rearwardly from a head pipe, left and right pivot plates mounted on a rear end of the left and right main frames, and left and right seat rails extending obliquely upwardly from an upper portion of the left and right pivot plates, said left frame, right frame and head pipe and said left pivot plate, right pivot plate, left seat rail and right seat rail being joined together by welding cast parts,
wherein the seat includes a front seat and a rear seat, said front seat being secured to said left and right seat rails, said rear seat being secured to the rear frame, and
wherein the rear seat is secured to the rear frame by left and right brackets mounted on the rear frame by fastening members.

6. The motorcycle according to claim 5, and further including elastic members interposed between the rear seat and the rear frames for supporting a load on the rear seat.

7. A motorcycle including a vehicle body, a main frame extending rearwardly from a front portion of said vehicle body, a seat extending rearwardly from a substantially central portion of said vehicle body for providing seating for an occupant, a trunk provided on a rear side of said seat for storing luggage, and a backrest mounted to a front wall of said trunk for supporting a back of said occupant,
wherein a rear frame for supporting said trunk is detachably mounted to said main frame, and said rear frame extends to a position below said seat, and
wherein the seat includes a front seating portion and a rear seating portion arranged in tandem relative to each other and said front seating portion and said rear seating portion being separate relative to each other.

8. A seat for use with a motorcycle comprising:
a main frame extending rearwardly from a head pipe;
a front seat supported by said main frame and extending rearwardly;
a rear frame detachably mounted to said main frame and extending rearwardly therefrom; and
a rear seat supported by said rear frame,
wherein said main frame includes a left frame and a right frame extending rearwardly from said head pipe, left and right pivot plates mounted on a rear end of the left and right main frames, and left and right seat rails extending obliquely upwardly from an upper portion of the left and right pivot plates, said left frame, right frame and head pipe and said left pivot plate, right pivot plate, left seat rail and right seat rail being joined together by welding cast parts,
wherein said front seat is secured to said left and right seat rails and said rear seat is secured to said rear frame, and
wherein the rear frame is secured to a rear portion of said left and right seat rails for enabling a path of transmission of vibrations to said rear seat to be distinct from a path of transmission of vibrations to said front seat.

9. The seat for use with a motorcycle according to claim 8, wherein:
said front seat is adapted to be used by a rider and said rear seat is adapted to be used by a passenger;
said front seat and said rear seat being arranged in tandem in a longitudinal direction; and
said rear frame extends to a position below said rear seating portion, so that the load of the passenger sitting on said rear seating portion is borne by said rear frame.

10. The seat for use with a motorcycle according to claim 8, wherein said rear frame is formed by welding bent parts formed from tubular members.

11. The seat for use with a motorcycle according to claim 8, wherein said rear frame includes left and right frame members being constructed of tubular members, and wherein the cast parts of the main frame provide a high strength relative to the tubular members of the rear frame.

12. A seat for use with a motorcycle comprising:
a main frame extending rearwardly from a head pipe;
a front seat supported by said main frame and extending rearwardly;
a rear frame detachably mounted to said main frame and extending rearwardly therefrom; and
a rear seat supported by said rear frame,
wherein said main frame includes a left frame and a right frame extending rearwardly from said head pipe, left and right pivot plates mounted on a rear end of the left and right main frames, and left and right seat rails extending obliquely upwardly from an upper portion of the left and right pivot plates, said left frame, right frame and head pipe and said left pivot plate, right pivot plate, left seat rail and right seat rail being joined together by welding cast parts,
wherein said front seat is secured to said left and right seat rails and said rear seat is secured to said rear frame, and
wherein the rear seat is secured to the rear frame by left and right brackets mounted on the rear frame by fastening members.

13. The seat for use with a motorcycle according to claim 12, and further including elastic members interposed between the rear seat and the rear frames for supporting a load on the rear seat.

14. A seat for use with a motorcycle comprising:
a main frame extending rearwardly from a head pipe;
a front seat supported by said main frame and extending rearwardly;
a rear frame detachably mounted to said main frame and extending rearwardly therefrom; and
a rear seat supported by said rear frame,
wherein the front seat and the rear seat are arranged in tandem relative to each other and said front seat and said rear seat are separate relative to each other.

* * * * *